2,803,342

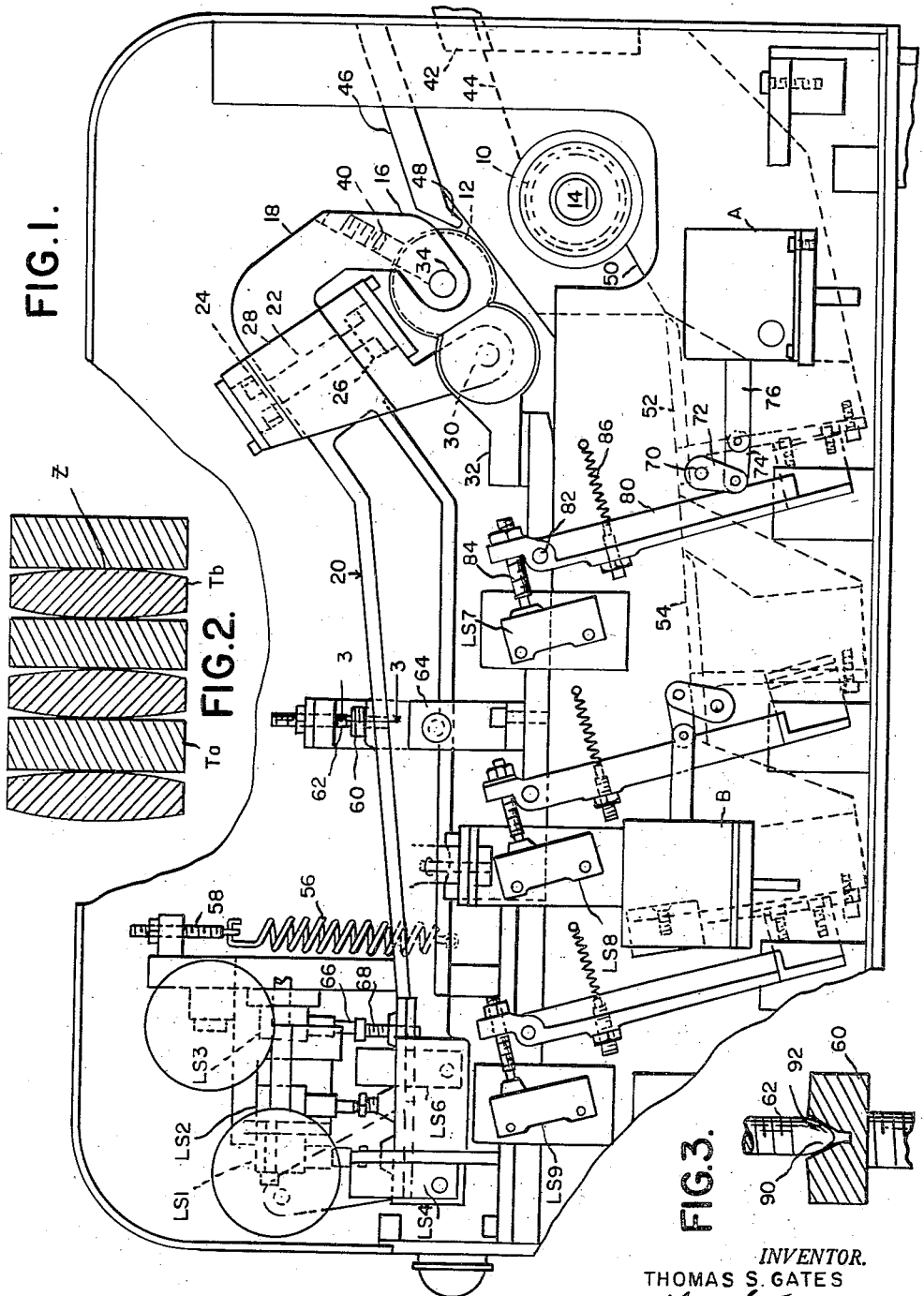

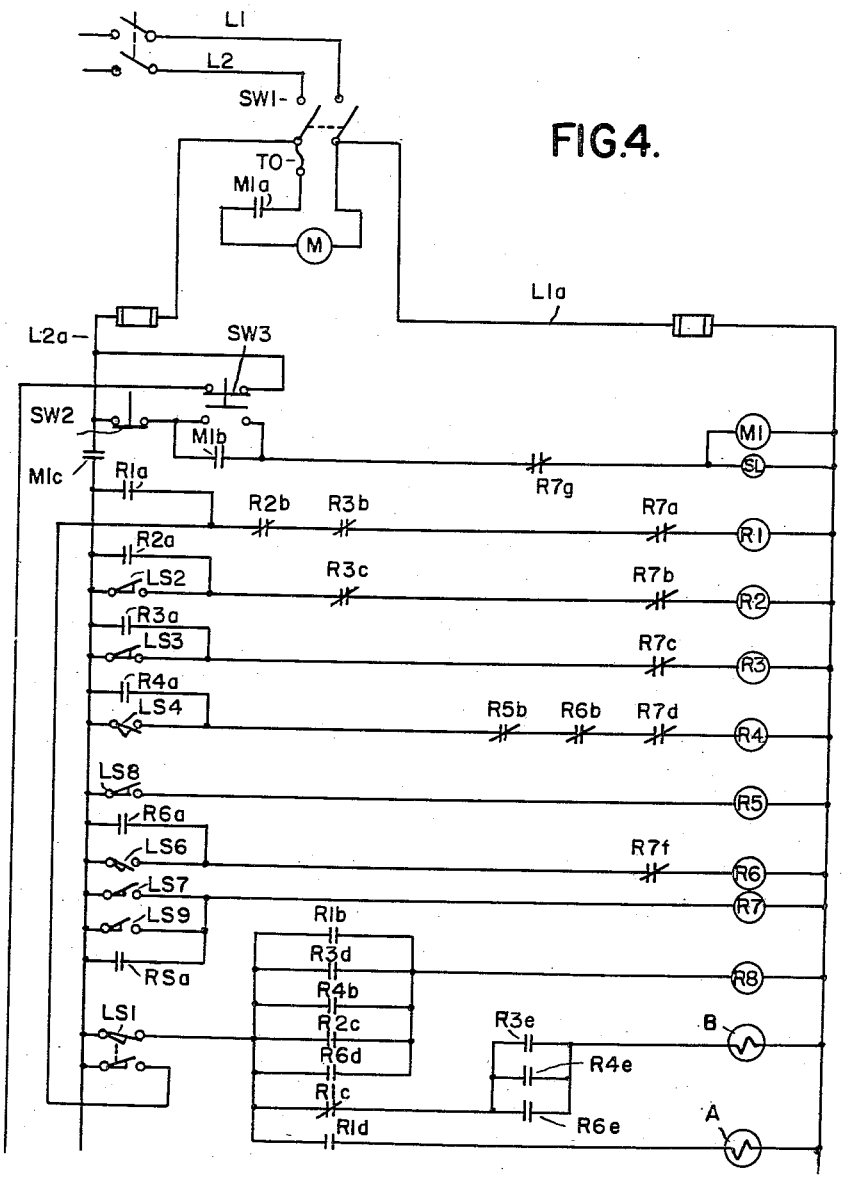

GEAR GAUGING APPARATUS

Thomas S. Gates, Grosse Pointe Woods, Mich., assignor to National Broach & Machine Company, Detroit, Mich., a corporation of Michigan Application September 12, 1955, Serial No. 533,619

6 Claims. (Cl. 209—88)

The present invention relates to gear gauging apparatus, and more particularly, to automatically operated gauging apparatus effective to determine a minimum predetermined deviation from a plurality of standard gear conditions and to separate gears into a plurality of groups in a fully automatic operation, the groups comprising acceptable gears, gears which are unacceptable but which are capable of being salvaged, and unacceptable gears which are not capable of being salvaged or scrap gears.

The present invention is an improvement over the invention disclosed in my prior application Serial No. 466,118 entitled "Automatic Gear Gauging Device," filed November 1, 1954.

It is an object of the present invention to provide gear gauging apparatus including means movable in two different directions in accordance with two different gear characteristics, and means for preventing movement in one direction until a predetermined minimum movement has taken place in the other direction to insure proper sequence of sensing of gear errors.

More particularly, it is an object of the present invention to provide gear gauging apparatus comprising an arm movable about a first axis in accordance with the size of a gear being gauged and movable about a second axis perpendicular to the first axis in accordance with the helix angle of the teeth on the gears being gauged, limit switches actuated by movement of the arm about either of said axes, and means for preventing substantial swinging movement of said arm about one of said axes until it has moved a predetermined minimum distance about the other of said axes.

Still more specifically, it is an object of the present invention to provide gear gauging apparatus comprising an arm movable from a rest position through a first range of positions corresponding to slightly undersize condition of a gear, through a second range of positions corresponding to acceptable dimensions of a gear, and into a third range of positions corresponding to slightly oversize condition of a gear; and movable about a second axis perpendicular to the first axis from an intermediate range of positions corresponding to acceptable helix angle of a gear to either side of such range in accordance with unacceptable right and left hand deviation in gear helix angle, three limit switches, one or more of which is adapted to be actuated sequentially by said arm upon movement from rest position about the first axis toward the third range of positions, a pair of limit switches adapted to be actuated alternately by movement of said arm about said second axis in both directions out of the acceptable range of helix angle, gear selecting mechanism to separate a series of gears into acceptable gears, salvageable gears, and scrap gears, and means for preventing actuation of either of said pair of limit switches at least until the first of said three limit switches has been actuated.

It is a further object of the present invention to provide gear gauging apparatus comprising one or more master gears adapted to be meshed with a gear to be gauged, at least one of said master gears having its teeth modified longitudinally and preferably crowned to eliminate or minimize the effect of helix angle or taper error in gauging size.

Other objects and features of the invention will become apparent as the description proceeds, especially when taken in conjunction with the accompanying drawings, wherein:

Figure 1 is a more or less diagrammatic elevational view of gear gauging apparatus constructed in accordance with the present invention.

Figure 2 is a developed sectional view through a meshing master gear and work gear developed into a plane.

Figure 3 is a fragmentary sectional view on the line 3—3, Figure 1.

Figure 4 is a wiring diagram of electrical equipment associated with the mechanism shown in Figure 1.

The gear gauging apparatus disclosed in Figure 1 is intended to gauge a series of gears as finished by a gear finishing operation, such for example as a gear shaving operation. Alternatively, the same mechanism may be employed for gauging a series of gears in a fully automatic operation as the gears are advanced into a machine for shaving the gears. In order to control the sequence of gauging in an orderly manner, a stop gate may be provided which admits the gears one at a time to the gauging apparatus. This gate may conveniently be under the control of a solenoid actuated by exit from the gauging apparatus of the gear previously gauged. Since the gauge may be used to shut down the shaving machine, it is desirable that gears be gauged substantially as they are finished by the machine.

The gauging apparatus comprises a pair of master gears 10 and 12, the gear 10 being mounted on a shaft 14. Preferably, suitable motor means (not shown) is connected to the shaft 14 to drive the gear 10 in a counter-clockwise direction as seen in Figure 1, to advance gears automatically into the apparatus and through the space between master gears 10 and 12.

The master gear 12 is located adjacent the master gear 10 with its axis generally parallel thereto, thereby providing a space between the master gears 10 and 12 through which a series of gears to be checked or gauged are passed. The master gear 12 is journaled between parts 16 at the end of a gooseneck 18 provided on a relatively long measuring or gauging arm 20 which preferably is formed of a cast light metal such for example as aluminum or magnesium. The purpose of providing the long arm 20 is to magnify or amplify movement of the master gear 12 resulting from passage of a work gear between master gears 10 and 12. The arm 20 is journaled for angular movement about the axis of a pivot shaft 22, the ends of the shaft 22 being received in bearings as indicated at 24 and 26, the bearings being received in a bracket 28 which in turn is mounted for rocking movement about a pivot pin 30 carried by a stationary mounting bracket 32. As a result of the foregoing construction the gauging arm 20 is movable together with bracket 28 about the axis of the pivot pin 30 and is movable relative to the bracket 28 about the axis of the pivot pin 22.

The master gear 12 is rotatably mounted on a pivot pin 34 but is held against rotation by a plug of soft material pressed against the periphery thereof by a screw 40. By loosening the screw 40, the master gear 12 may be slightly rotated to present a different portion of its periphery to gears being gauged.

The gears to be checked are led to the gear gauging apparatus along a suitable chute or trackway, a portion of which is indicated at 42, whence the gears pass to a surface 44 along which they roll into engagement with the rotating or driving master gear 10. As the gear to be gauged engages the master gear 10, it may or may not in the first instance become meshed therewith and a plate 46 having a nose portion 48 is provided which prevents the gear being gauged from contacting the upper master gear 12 until it has become fully meshed with the lower rotating master gear.

As the gear to be gauged passes through the space between the master gears 10 and 12, the teeth of the master gear 12 will enter into the spaces in the gear being gauged and the arm 20 will be swung about the axis of the shaft 30 to a point determined by the pitch diameter of the gear being gauged. At the same time, or in suitably timed relation as will subsequently appear, the arm 20 will be swung about the axis of the shaft 22 in accordance with any right or left hand helix angle error present in the gear being gauged.

After the gear has passed through the space between the master gears 10 and 12 it drops to a surface 50 and thence rolls downwardly and to the left over trap doors 52 and 54, and thence drops off the trackway to a conveyor or receptacle for receiving gears within acceptable limits as to size and helix angle. As will subsequently appear, either of the trap doors 52 or 54 may be projected into an open position in which they block passage of the gauged gear and cause it to drop down to a conveyor or receptacle for the reception of rejected gears.

The arm 20 has connected thereto a tension spring 56 the upper end of which is connected to an adjustable screw 58. The spring 56 biases the arm 20 clockwise as seen in Figure 1, to a position in which an abutment 60 thereon engages an adjustable abutment and timing screw 62 carried by a post 64. Adjustment of the screw 62 predetermines the position of the master gear 12 prior to engagement therewith of a gear being gauged. This adjustment is normally such that passage of even an abnormally undersize gear will result in counterclockwise movement of the arm 20 as seen in Figure 1. In other words, the illustrated position of the arm 20 may be referred to as "under under-size"; that is, a position from which it will be displaced by passage of the smallest undersize gear expected to be within the lot gauged.

Associated with the arm 20 and cooperating therewith to sense or measure size of the gear being gauged are limit switches LS1, LS2 and LS3, these switches having plungers indicated generally at 66, actuated by adjustment screws 68 on the arm 20. The arrangement is such that as a gear having a pitch diameter or size such as to be unacceptable as undersize passes between master gears 10 and 12, the arm 20 is swung clockwise an amount sufficient to actuate limit switch LS1. If the gear is of acceptable size arm 20 will be swung slightly further so as to actuate limit switch LS2. If the gear is unacceptable as a result of being over size, arm 20 will be swung still further to a position to actuate limit switch LS3.

In addition, limit switches LS4 and LS6 are provided and adapted to be actuated by the arm 20 as it is swung about the axis of pivot pin 22. Specifically, limit switch LS4 is in a position to be actuated when the arm 20 is swung as a result of a left hand helix angle error of unacceptable magnitude, and limit switch LS6 is in position to be actuated by arm 20 when it is moved as a result of a right hand helix angle error in a gear being gauged of unacceptable magnitude.

Means are provided for actuating the trap doors 52 and 54 and these means comprise solenoids A and B respectively. The trap doors 52 and 54 are carried by pivot pins 70 having cranks 72 connected thereto, the cranks being connected by links 74 to the plungers 76 of the solenoids. The arrangement is such that when the solenoids A or B are energized the trap doors are swung upwardly, leaving openings through which the gauged gears may descend. The trap doors in the raised position also form barriers to insure passage of the gear through the opening and to prevent further passage of the gear along the trackway.

The trap doors 52 and 54 each cover an escape exit for gauged gears and gears which pass both trap doors roll off the end of the trackway as previously described. In order to provide means which sense the movement of a gear downwardly through a space vacated by a trap door or cross the space at the end of the trackway, identical means are provided. These means comprise levers 80 mounted for rocking movement by pivot pins 82 and having lower end portions in position to be engaged by a gear passing out of the gauging apparatus. At their upper ends each of the levers 80 includes an adjustable switch actuating screw 84 and these are adapted to actuate limit switches LS7, LS8 and LS9. Spring means 86 is provided biasing the levers 80 into position to clear the associated limit switches and to be in the path of movement of the gears out of the gauging apparatus.

In general, the arrangement is such that as a gear passes between the master gears 10 and 12, the arm 20 is swung so as to actuate one or more of the limit switches LS1, LS2 and LS3, and to actuate one of the limit switches LS4 or LS6 if the gear has too great a helix angle error. Dependent upon which of these limit switches have been actuated, one of the trap doors 52 or 54 may be raised or both may remain closed. In any case, a gear passing out of the gear gauging apparatus will actuate one of the limit switches LS7, LS8 or LS9, giving a signal that the apparatus has cleared the gear and is ready to receive the next gear for a gauging operation.

As will appear from the description of the wiring diagram, an under size gear, which cannot be salvaged, will actuate limit switch LS1 and this in turn will actuate solenoid A so that by a circuit later to be described trap door 52 is raised and this scrap gear will be ejected downwardly through the space vacated by the trap door 52. If the gear is oversize or is unacceptable as a result of having a helix angle error, it may be salvaged and will actuate limit switch LS3 and/or LS4 or LS6, thus raising trap door 54 and permitting this salvageable gear to pass to a different chute or receptacle.

If the gear is acceptable both as to size and helix angle limit switches LS1 and LS2 only will be actuated and the gear will pass over both of the trap doors 52 and 54 and will pass to a third chute or receptacle designated for acceptable gears.

Referring now to Figure 4, there is illustrated the circuit interconnecting the various limit switches and solenoids previously referred to. The circuit includes lines L1 and L2 connected through a switch SW1 and thermal overload device TO to lines L1a and L2a respectively. Connected across the switch SW1 is a motor M controlled by contacts M1a of a master relay M1. Extending between lines L1a and L2a is a stop switch SW2, the contacts of a start-reset switch SW3, and the master relay M1. Normally open contacts M1b of the relay M1 are connected around the start contacts of the switch SW3 and a signal light SL is connected in parallel with the master relay M1.

From the foregoing it will be apparent that when the start-reset switch SW3 is depressed into engagement with the lower pair of contacts, a circuit is completed through the stop switch SW2 and the master relay M1. Energization of the relay M1 closes normally open contacts M1a, thus engaging the motor M and also closing normally open contacts M1b and M1c. Closure of contacts M1b establishes a holding circuit around the lower pair of contacts of the start-reset switch SW3, and closure of the contacts M1c energizes the circuit to the various limit switches as will now be described.

It will be recalled that condition limit switches LS1, LS2 and LS3 are adapted to be actuated in sequence as a gear passes through the space between master gears 10 and 12 if the gear is oversize. An undersize gear actuates limit switch LS1. If the gear is of the required size limit switches LS1 and LS2 are actuated in sequence but limit switch LS3 is not actuated. Limit switch LS1 is provided with two sets of contacts and will move from the illustrated position to the lower position upon initial movement of the arm 20. This completes a circuit from line L2a to line L1a through normally closed relay contacts R2b, R3b, R7a to relay R1. Energization of relay R1 closes normally open contacts R1a, thus establishing a holding circuit for the relay R1 independent of condition limit switch LS1. In addition, energization of the relay R1 also closes normally open contacts R1b and R1d and opens normally closed contacts R1c.

Condition limit switch LS2 is connected between lines L2a and L1a in series with normally closed contacts R3c, R7b and relay R2. Relay R2 when energized closes normally open contacts R2a establishing a holding circuit around limit switch LS2. In addition, energization of relay R2 closes normally open contacts R2c and opens normally closed contacts R2b in series with the relay R1, thus de-energizing relay R1.

Condition limit switch LS3 is also connected between lines L2a and L1a and is in series with normally closed contacts R7c of relay R7 and with relay R3. Energization of relay R3 closes normally open contacts R3a, establishing a holding circuit around limit switch LS3, and opens normally closed contacts R3b and R3c, thus breaking the circuit to relay R2. The circuit to relay R1 was previously broken by closure of limit switch LS2. Normally open contacts R3d and R3e are also closed by energization of relay R3.

With the three branch circuits including relays R1, R2 and R3, it will be observed that initial movement of the arm 20 operates condition limit switch LS1 from the position shown and will energize relay R1. Further movement of the arm 20 operates condition limit switch LS2 which will de-energize relay R1. Still further movement of the arm 20 will operate condition limit switch LS3 to energize relay R3 which will de-energize relay R2. Accordingly, if an undersize gear passes between the master gears 10 and 12, relay R1 becomes and remains energized. If a normal size gear passes between the master gears, relay R1 is energized and de-energized when relay R2 is energized. Relay R3 is not energized. If an oversize gear passes between the master gears relay R3 becomes and remains energized and relays R1 and R2 are de-energized. From this standpoint it will be appreciated that condition limit switches LS1, LS2 and LS3 cooperate to control the gauging apparatus in accordance with the size of the gear, limit switch LS1 having the additional function of delaying operation of the solenoids until the gear being gauged has passed the master gears.

In a similar manner, condition limit switches LS4 and LS6 are responsive to helix angle error, each being connected in series with relays R4 and R6 respectively. The circuit including the relay R4 includes normally closed contacts R5b, R6b and R7d. The circuit including the relay R6 includes normally closed contacts R7f. Limit switches LS4 and LS6 are each provided with holding contacts R4a and R6a respectively. The arrangement is such that if the gear exhibits off-helix angle to the left limit switch LS4 energizes relay R4, closing normally open contacts R4a, R4b and R4e. In like manner, if limit switch LS6 is closed, energization of relay R6 closes normally open relay contacts R6a, R6d and R6e and opens normally closed contacts R6b.

In addition to the limit switches so far described, limit switches LS7 and LS9 are connected in parallel with each other between the lines L2a and L1a. The two limit switches are in series with relay R7. The arrangement is such that closure of either limit switch LS7 or LS9 energizes relay R7. Energization of relay R7 opens normally closed relay contacts R7a, R7b, R7c, R7d and R7f. In addition, limit switch LS8 is in series with relay R5 and closure of limit switch LS8 closes normally open relay contacts R5a which are in parallel with the contacts of both limit switches LS7 and LS9.

It will be recalled that limit switches LS7, LS8 and LS9 are actuated by passage of a gear through any one of the three escape paths. Closure of limit switch LS8, energizing relay R5, closes relay contacts R5a and therefore has the same effect as closure of limit switches LS7 or LS9 in energizing relay R7. Relay R8 is provided which is adapted to enter into an additional circuit for the purpose of counting rejected gears.

If an undersize gear passes through the machine it will have actuated only limit switch LS1 and this will have energized relay R1, closing normally open contact R1d. This contact is in series with solenoid A. Accordingly, a circuit will be prepared for subsequent energization extending from the upper contacts of limit switch LS1 through normally open but now closed contact R1d. When the gear has passed through the space between the master gears, limit switch LS1 will return to the illustrated position, thus completing a circuit to the solenoid A which will remain energized and will hold trap door 52 open. The gauged gear will thus pass through the opening vacated by the trap door 52 and will engage the associated lever 80, thus closing limit switch LS7. Closure of limit switch LS7 momentarily energizes relay R7 which in turn opens all of the normally closed contacts R7a, R7b, R7c, R7d and R7f, and thus in turn de-energizing any of the relays R1, R2, R3, R4 or R6 which are at that time energized. This in turn opens normally open contacts R1d, de-energizing solenoid A and permitting trap door 52 to close.

If on the other hand, the gear is of proper size so that the limit switch LS2 remains closed, thus maintaining relay R2 closed, but is off-angle with a right hand helix angle error, limit switch LS6 is closed energizing relay R6 and closing normally open contacts R6e. At this time relay R1 has opened as a result of closure of limit switch LS2 and accordingly, normally closed contacts R1c are closed and a circuit is set up through contacts R1c and R6e to solenoid B. This circuit is completed when limit switch LS1 returns to the illustrated position after passage of a gear through the master gears. Energization of solenoid B of course lifts trap door 54 and the gear, which is salvageable as a result of having its teeth off-angle, thus falls into a chute or receptacle designated for the reception of salvageable gears. It will be apparent of course that a similar result is obtained when limit switch LS3 or LS6 is closed since this will result in closure of normally open contacts R3e or R6e, which are in parallel with contacts R4e.

From the foregoing it is to be observed that limit switch LS1 prepares the circuit for further operation and accordingly, it is essential that limit switch LS1 move to the lower position before either of the helix angle error detecting limit switches LS4 or LS6 is energized. This is also an essential since it is required to separate undersize gears, as sensed by limit switch LS1 from gears which are oversize as sensed by limit switch LS3, off-angle to the left as sensed by limit switch LS4, or off-angle to the right as sensed by limit switch LS6.

In order to insure the proper sequence in actuation of the limit switches, and at the same time to avoid introduction of errors by imposing substantial forces on the delicate mechanism, the block 60 which with the adjustable screw 62 constitutes the abutment limiting the idle position of the gauging arm 20, is formed as illustrated in Figure 3. It will be observed that the nose of the adjustable screw 62 is rounded off or tapered as indicated at 90 and the block 60 is provided with a centering notch of U-shape as indicated at 92. Accordingly, when a gear passes through the space between the master gears 10 and 12, the spring 56 biases the gauging arm 20 clockwise. Engagement between the tapered nose 90 of the screw 62 and the V-shaped notch in the abutment 60 causes the arm to become centered between helix angle error sensing limit switches LS4 and LS6. Moreover, the sides of the notch 92 and the nose of the screw 62 are so shaped that lateral movement of the arm 20 is restricted to an amount insufficient to operate either of the limit switches LS4 or LS6 until after the arm has moved sufficiently to actuate limit switch LS1.

With this arrangement the arm is substantially free to move laterally but such movement is prevented until after limit switch LS1 has been actuated.

A further improvement in the gauging apparatus comprises providing the teeth of one or both of the master gears 10 or 12 with longitudinal modification to produce certain desired results. A preferred form of the invention is diagrammatically illustrated in Figure 2 which may be considered as a sectional view taken on the pitch cylinders of two meshing gears and then developed into a single plane. $Ta$ represents the teeth of the gear being gauged and $Tb$ represents longitudinally convexly crowned teeth of a master gear.

It will be appreciated that if the arm 20 is prevented from oscillating about the axis of the shaft 22, the apparatus may operate to gauge the size of a gear passed between the master gears 10 and 12. However, in this case, if the teeth of the master gear are off-lead, the teeth will not mesh to full depth with the teeth of the master gears, and accordingly, the apparatus will give an indication of an oversize gear. Similarly, if the teeth of the gear being gauged are tapered so as to be larger at one end than the other, they will mesh to full depth only at one end and this will also give an indication of being oversize. Accordingly, an oversize gear, which in addition has teeth extending at an off-lead condition and which are in addition tapered, will be indicated merely as oversize.

In order to eliminate the false portion of the oversize indication resulting from off-lead and/or tapered teeth, the teeth of the master gear or master gears may be crowned longitudinally so as to have the theoretical perfect tooth thickness only at the center. In this case the master gear will contact tapered teeth only adjacent the cener and will also mesh to substantially full depth with off-lead teeth so that the size indication shown by the gauge will be a true indication of size and will not include errors attributable to lead or taper errors.

It is recognized that in some cases a composite check may be desired in which case teeth of the master gear will not be crowned, and an indication will result which is dependent upon size, helix angle, and a tapered condition. It will also be appreciated that if the teeth of the gear being gauged are themselves crowned, it will be undesirable to provide crowned teeth on the master gear or master gears.

A second longitudinal tooth modification which is desirable in the present apparatus is in the case where the arm 20 is mounted for oscillation about mutually perpendicular axes so as to provide nominal size and helix angle checks at the same time. In this case, if the teeth of the gear to be checked are crowned, the contact between the teeth of the work gear and the teeth of the master gear 12 will be limited to substantially point contacts one at each side of each tooth, and accordingly, insufficient torque may be developed to swing the arm 20 about the axis of pivot shaft 22. In order to overcome this difficulty it is desirable to provide longitudinally hollow or reverse crowned teeth on the master gear or master gears, in an amount to substantially conform to the crown of the teeth on the work gear. In this case contact of theoretically correct teeth will be line contact from end to end of the gear teeth and from end to end of the teeth of the master gear 12. If however, an off-lead condition exists, contact between the teeth of the work gear and the master gear 12 will be at opposite ends of the teeth of the master gear 12 so that sufficient torque is developed to swing arm 20 about the axis of shaft 22, and thus to provide a true indication of gear error.

In general, it may be said that if the apparatus is designed so that the arm 20 oscillates about the axis of shafts 22 and 30, it is desirable to employ a master gear or master gears having a crown or reverse crown matching the crown or reverse crown on the teeth of the gear to be checked, so as to develop sufficient torque to provide a true indication of helix error. On the other hand, if the apparatus is employed in such a way as to prevent oscillation of the arm 20 about the axis of the shaft 22, the teeth of the master gear or master gears may be crowned if it is desired to obtain a substantially true indication of size unaffected by helix angle or taper error. If on the other hand, a composite reading is desired which represents the accumulation of size, helix and taper error, the crowned teeth will not be employed on the master gear or master gears.

The drawings and the foregoing specification constitute a description of the improved gear gauging apparatus in such full, clear, concise and exact terms as to enable any person skilled in the art to practice the invention, the scope of which is indicated by the appended claims.

What I claim as my invention is:

1. Gear checking apparatus comprising a moveable arm movable about a first axis from a rest position corresponding to a gear size substantially below any gear of a series to be checked through a first range of size positions corresponding to undersize gears, through a second range of size positions corresponding to acceptable gear sizes, and into a third range of size positions corresponding to oversize gears, said arm being movable about a second axis perpendicular to said first axis from a first range of angle positions corresponding to gears acceptable as to helix angle in either direction into two ranges of angle positions corresponding to gears unacceptable because of helix angle errors, means effective when no gear is being gauged to return said arm to said rest position, and guide means effective to locate said arm within said first range of angle positions while at said rest position.

2. Apparatus as defined in claim 1 comprising means for separating rejected gears according to size and angle error, said means comprising a first switch operated by said arm upon movement into said first range of size positions, a pair of switches one of which is operated by movement of said arm from said first range of angle positions to either of said two ranges of angle positions.

3. Apparatus as defined in claim 2, said guide means being shaped to prevent movement of said arm about said second axis of sufficient magnitude to actuate either of said pair of switches until said arm has moved about said first axis from rest position into said first range of size positions.

4. Apparatus as defined in claim 1, said guide means comprising a V-shaped notch adjacent said arm, and means on said arm movable into said notch, the angle between the sides of said notch being selected to prevent actuation of either of said pair of switches before actuation of said first switch upon passage of a gear through the apparatus.

5. Gear gauging apparatus comprising means for moving a series of gears to be gauged through fully meshed engagement with two master gears, a movable arm on which one of said master gears is mounted, pivot means mounting said arm for rocking movement in a direction to move the master gear carried thereby substantially radially toward and away from a gear to be gauged, indicating mechanism associated with said arm adapted to measure the size of the gear, the teeth of one of said master gears being longitudinally crowned so as to provide clearance between the ends of the teeth of the gear being gauged and the teeth of the master gear and to limit contact therebetween to a zone located substantially inwardly from the ends of the teeth of the gear being gauged.

6. Gear gauging apparatus comprising means for moving a series of gears to be gauged through fully meshed engagement with two master gears, a movable arm on which one of said master gears is mounted, pivot means mounting said arm for rocking movement in a direction to move the master gear carried thereby substantially radially toward and away from a gear to be gauged, indicating mechanism associated with said arm adapted to measure the size of the gear, the teeth of both of said master gears being longitudinally crowned so as to provide clearance between the ends of the teeth of the gear being gauged and the teeth of the master gear and to limit contact therebetween to a zone located substantially inwardly from the ends of the teeth of the gear being gauged.

References Cited in the file of this patent

UNITED STATES PATENTS

| | | |
|---|---|---|
| 2,542,090 | Lorenz | Feb. 20, 1951 |
| 2,761,560 | Pomernacki | Sept. 4, 1956 |

OTHER REFERENCES

"Continuous blank machining in gear production," by J. J. McCabe, "Automation," June 1955, pages 26–29.

"Versatility accentuated in continuous gear production," by C. E. Scott, "Automation," April 1955, pages 47–53.